A. C. Harig,
Door Key,
Nº 9,599.    Patented Mar. 1, 1853.
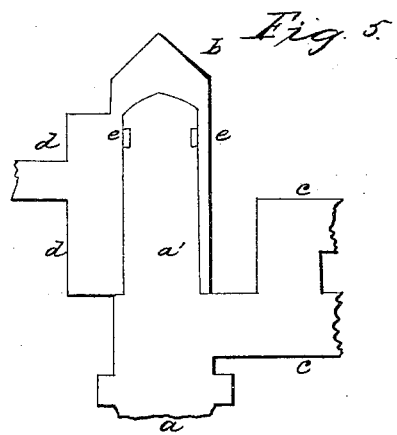
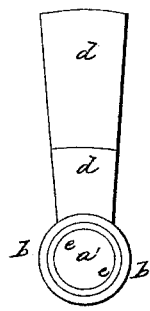
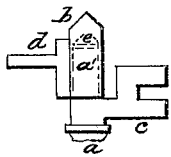
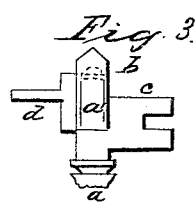
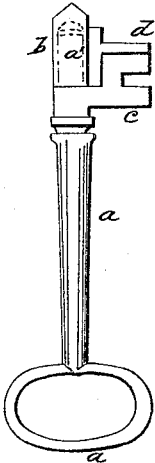
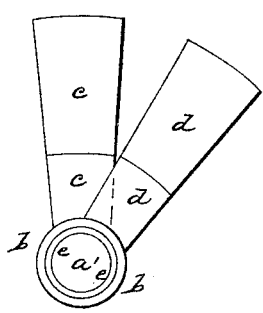
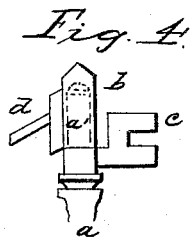

UNITED STATES PATENT OFFICE.

AUGUSTUS C. HARIG, OF LOUISVILLE, KENTUCKY.

SWIVEL-NIBBED KEY FOR DOOR-LOCKS.

Specification of Letters Patent No. 9,599, dated March 1, 1853.

*To all whom it may concern:*

Be it known that I, AUGUSTUS C. HARIG, of Louisville, in the county of Jefferson and State of Kentucky, have invented certain new and useful Improvements in the Construction of Keys for Door-Locks, &c., the object of which is effectual security against the picking of any lock to which the key is adapted; and I do hereby declare that the following is a full, clear, and exact description of the construction and operation of the same, reference being had to the annexed drawings, making a part of this specification, in which—

Figure 1 is a side view of the key, with its bow, shank, bits, &c. Fig. 2 is a side view of main and guard bits, with the safety guard revolved half around on its axis or tenon, and showing the position of the groove in the latter, for the reception of the annular collar. Fig. 3 same as Fig. 2, the position of the groove excepted. Fig. 4 is an oblique view of the main bit, safety guard, &c. N. B.: The dotted lines in the foregoing figures represent the position of the tenon or axis of the safety guard. Fig. 5 is an enlarged view of a longitudinal section through the axis of the key, &c., with the main bit and safety guard revolved in opposite direction. Fig. 6 is an enlarged view of a transverse section through the main bit, safety guard, &c., with both bits in conjunction. Fig. 7 is an enlarged view of the same, with the safety guard partially revolved.

The safety guard key, consists of a bow shank and bit, as in ordinary keys, except that the bit is modified in such a manner as to admit of an additional bit, which I call the safety guard, the shank or cylindrical part of which, is made tubular and receives a cylindrical tenon, protruding directly from the end of the main shank, of which it is a reduced prolongation, entering the perforated cavity of the safety guard shank, and serving as an axis, on which the latter may revolve.

The annexed drawings and explanations in reference thereto, which are intended as part and parcel of this specification, will show more clearly, the form, mode of using and manner of constructing the several parts of the safety guard key.

From the foregoing view and explanation of the figures, it is apparent that whenever the parts of the key are relatively in the position represented in Figs. 1 and 6, the key may be inserted through the key hole into the lock, and afterward may be made to assume the relative positions represented in either of the other figures, the key still remaining in the lock. It is moreover obvious, that whenever the key is thrust home on one side of the lock, the safety guard will be fixed and stationary on the other side; effectually stopping up the key hole, on the side last referred to, and preventing the insertion or application of any pick locks on that side.

*References and explanations.*—The bow and shank, similar to those in ordinary use, except the cylindrical tenon at $a'$, which is reduced to a size adapted to the caliber or perforation of the shank, or cylindrical portion of the safety guard. The shank or cylindrical portion of the safety guard perforated longitudinally for the reception of the tenon or axis $a'$, which may revolve therein. The main bit with suitable recesses for the passage of lock wards, and the base or radical portion of the safety guard in its revolutions. The bit, base, &c., of the safety guard, with its tubular shank, groove and collar, the lattter being represented by shade lines, as in Figs. 5, 6, and 7.

Note: Instead of the collar one or more screws or pivots may be inserted through the heel or toe of the guard or elsewhere, in such a manner that the end of the pivot may pass through the side of the tubular shank and enter the groove or grooves of the tenon whereby the safety guard will be confined to the main shank, and revolve on its axis as before represented.

The position of the groove and collar, the latter of which is lodged in the groove and made fast or incorporated with the interior surface or periphery of the cylindrical cavity of the shank $b$, by soldering effected by means of heat, applied externally to the said shank, and serves to confine the tenon $a'$, within the cavity, and admit the same to revolve freely therein. In Figs. 2 and 5, the groove is distinctly represented at $c$, and in Figs. 6 and 7, a section of the collar is represented by the same letter.

Note: By the arrangements represented in the drawings it is obvious, that no protruding portion of the key proper, by which the lock bit is moved, is presented on the outside of the lock, and consequently that no opportunity is afforded on that side, for the application of pick lock instruments, outsiders, &c.

I am aware that the rib of the key has been fitted into the tubular shank and so secured therein, by a pin fitting into a groove, that the burglar's instrument when applied to the nib, would rotate it without moving the key; and in connection therewith I am also aware that the key by a plate attached to the inner lock plate has been held so that it could not be rotated, and I therefore do not claim these devices; but What I do claim as of my invention and desire to secure by Letters Patent is—

The guard bit (d) attached to the swivel nib in combination with the ordinary bit and shank of the key constructed and operating substantially as herein set forth.

AUGUSTUS C. HARIG.

Witnesses:
D. C. STOY,
JOHN PATTERSON.